(12) United States Patent
Repka et al.

(10) Patent No.: US 11,070,684 B2
(45) Date of Patent: Jul. 20, 2021

(54) RETAIL PHOTO ORDER PRODUCTION AND WORKFLOW MANAGEMENT SYSTEM AND METHODS OF USE

(71) Applicant: KODAK ALARIS INC., Rochester, NY (US)

(72) Inventors: Richard H. Repka, Rush, NY (US); Stephen J. Pasquarette, Honeoye Falls, NY (US); Scott C. Robinson, Honeoye Falls, NY (US); Michael S. Graham, Webster, NY (US); Nicole Petra Ellsaesser, Stuttgart (DE); Lydia C. Powers, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 16/156,721

(22) Filed: Oct. 10, 2018

(65) Prior Publication Data
US 2019/0215408 A1  Jul. 11, 2019

Related U.S. Application Data

(60) Provisional application No. 62/571,532, filed on Oct. 12, 2017.

(51) Int. Cl.
*H04N 1/00* (2006.01)
*H04N 1/34* (2006.01)
*G06Q 30/06* (2012.01)

(52) U.S. Cl.
CPC ..... *H04N 1/00188* (2013.01); *G06Q 30/0601* (2013.01); *H04N 1/00132* (2013.01);
(Continued)

(58) Field of Classification Search
None
See application file for complete search history.

(56) References Cited

U.S. PATENT DOCUMENTS

2003/0217240 A1\* 11/2003 Satomi .................... G06F 16/20
  711/161
2010/0091321 A1\* 4/2010 LeVier ............... H04N 1/00567
  358/1.15
(Continued)

OTHER PUBLICATIONS

International Search Report and Written Opinion dated Dec. 17, 2018 in PCT/US2018/055188.

*Primary Examiner* — Andrew H Lam
(74) *Attorney, Agent, or Firm* — Hogan Lovells US LLP (57) ABSTRACT

Described herein is a multi-user retail photo kiosk system that includes multiple touch screen and Graphic User Interface (GUI) controlled consumer photo editing, photo print and product selection, and photo order placement terminals and multiple photo printers. The user photo kiosk terminals can receive images. Billing and payment is accomplished using barcoded receipts provided at the user terminal for payments for purchased photo products. A printer array incorporating various printers capable of producing prints or various sizes and formats can be configured as a horizontal counter or as a vertical tower and includes means to alert the user that their photo print order is complete. In addition, the system automatically notifies operators if equipment service, maintenance, media refilling, and/or post printing finishing procedures are required.

25 Claims, 7 Drawing Sheets

(52) U.S. Cl.
CPC ..... *H04N 1/00143* (2013.01); *H04N 1/00145* (2013.01); *H04N 1/00175* (2013.01); *H04N 1/00289* (2013.01); *H04N 1/00392* (2013.01); *H04N 1/34* (2013.01)

(56) References Cited

U.S. PATENT DOCUMENTS

| | | | |
|---|---|---|---|
| 2013/0184845 A1* | 7/2013 | Hales | G05B 15/02 700/97 |
| 2014/0036312 A1 | 2/2014 | Haak | |
| 2015/0193846 A1 | 7/2015 | Lotze et al. | |

* cited by examiner

RETAIL PHOTO ORDER PRODUCTION AND WORKFLOW MANAGEMENT SYSTEM AND METHODS OF USE

CROSS-REFERENCE TO RELATED APPLICATIONS

This application is a non-provisional of, and claims priority to, U.S. Provisional Application No. 62/571,532, filed on Oct. 12, 2017, which is hereby incorporated by reference in its entirety.

BACKGROUND OF THE INVENTION

For decades, customers have visited retail stores to purchase photo products. Retail stores have traditionally provided resources to accommodate printing and manufacturing tasks. It has been recognized that at times, customer traffic at such retail stores can be sporadic, varying throughout a given day. But, there are noticeable periods during which spikes in customer traffic can be expected. Depending on local customs and cultures, users typically visit retail venues before or after work, during a lunch break, or on a day off. Alternatively, if the retail venue is located an entertainment/recreational venue then the peak number of users can vary seasonally, during peak tourist periods, when cruise ships arrive, and/or during a special event or attraction. High customer volume in a retail store can significantly strain the resources in the store (e.g., clerks and printer equipment), which has always been designed to accommodate a fixed/average number of users. Photo kiosks equipped with a single user input station are inefficient because inputting images, editing, and selecting images, prints, and photo products is time consuming and the array of output devices are idle until the single user submits their order.

Some photo products consist of simple prints which are ready for use as soon as they exit the printer. Other, more complex, photo products such as photo books, calendars, framed prints, greeting cards (which require manual folding at the crease and an envelope), and gallery prints require addition assembly and additional materials to finish the photo product. Certain of these specialty photo products require specialized printers, such as large format inkjet poster printers and electrophotographic printers. These types of printers cannot be housed in a typical photo kiosk that is responsible for producing simple photo prints; they must be stored in a separate, secure location within a retail store, and the specialty photo products produced thereon require attention by a clerk for completion.

There is financial pressure on retailers to keep staffing levels at a minimum. Yet, retailers need trained clerks because the procedures required for photofinishing are more complex, requiring more knowledge and skill than conventional retail work activities. The operator must know how to operate and calibrate printers, load new media, clear jams, operate a range of manual and semi-automatic finishing devices, and make color and density judgments on the produced output to ensure the quality of the product. In addition, providing a dedicated staff for photofinishing operations may not be possible and staff members have other duties unrelated to photofinishing, such as assisting customers, taking inventory, restocking shelves, handling returns, and cashing out customers. Retrieving users' photofinishing and print orders, finishing photo products, and maintaining and reloading printers all place additional burdens on the limited retail staff members. Further, staff turnover is an ongoing issue for retailers.

In addition to operator/clerk availability and the amount of work in the queue, some finishing equipment, such as thermal book binders and mug and apparel presses use thermal image transfer techniques and require a "warm up time" to reach the proper heat level, a dwell time to for thermal adhesives and transfer material to work, and a cool down period. Current systems do not offer any way to account for this or notify a clerk of the need to make appropriate preparations or accommodations. A further drawback in the art is the limited floor space in a retail establishment. Therefore, retailers would prefer to minimize the hardware components and workspace required to fulfill photo product purchases. Therefore, a system is needed that efficiently utilizes retail store space while still accommodating photo product requests.

Another consideration is that some jurisdictions, such as the European Union, have very strong laws and safeguards that protect user privacy which can limit access to personal information related to the user. This can lead to problems regarding providing alerts to users when their print orders are ready for pickup. Therefore, a system is required that allows for submission and printing of images in a manner that maintains the privacy of the customer and that eliminates "inadvertent sharing"—e.g., third parties being able to access or obtain the customer's identity or her photos, either intentionally or inadvertently.

Accordingly, a need exists for a multi-user retail photo product system that efficiently enables customers to place photo product orders and fulfill photo product orders with as little human interaction as possible. The prior art lacks an automated system that handles such tasks, including aspects such as billing, payment, and print order workflow.

SUMMARY OF THE INVENTION

The above deficiencies in the prior art and the previously described needs are fulfilled by the present invention, which is directed to a multi-user retail photo product creation system and uses thereof.

According to an embodiment of the present invention, a consumer retail photo kiosk system includes multiple touch screen and Graphic User Interface (GUI) controlled consumer photo editing, photo print and product selection, and photo order placement terminals, as well as and multiple photo printers. Such terminals (or kiosks) can receive images provided as hard copy via an included print scanner, or provided electronically via an included memory card reader, USB tether, or wirelessly from a digital camera or smart phone. An embodiment of the system is configured to facilitate billing, payment, and print order workflow. As one example, billing and payment may be accomplished using barcoded receipts provided at the user terminal for payments for purchased photo products.

A further embodiment of the system incorporates a printer array comprising various printers capable of producing prints or various sizes and formats. The printer array may be configured as a horizontal counter or as a vertical tower. It may have means to alert retail store clerks and customers of printer information, including that a particular photo product order is complete. Embodiments of the present invention are further configured to automatically notify an operator that attention to the printer array is required—for example, if equipment service, maintenance, media refilling, or post-printing finishing is required. In another embodiment, user-accessible output devices are arrayed in a horizontal or vertical structure with integrated means to direct the user to the appropriate output device collection bin to retrieve the photo product order.

According to another embodiment of the present invention, a method of operating a multi-user retail photo product creation system comprises receiving user-provided images via user-accessible wired or wireless digital or hardcopy image input devices; receiving a user selection of a photo product; calculating the fee for the photo product; and calculating an approximate time for completion. An embodiment further provides producing a physical or virtual receipt, the receipt comprising an identification of the customer's order. In an embodiment, the customer can use the receipt to retrieve her completed photo order.

According to another embodiment, one or more computer processors route a photo product orders to one or more digital output devices. The output devices display to the customers and retail store clerks specifications about the photo product, approximate time for completion, and whether any manual photo finishing is required of the store clerk. To the extent photo finishing is required of the store clerk, an embodiment of the present invention comprises presenting information to the designated operator via an operator communication device, which includes instructions for preparing the appropriate photo equipment for use, for preparing materials required for the completion of the photo product, and for finishing the photo product in accordance with the order. The one or more output devices may further display an indication of the location to retrieve the completed photo order.

BRIEF DESCRIPTION OF THE DRAWINGS

The aforementioned features of the invention will become more readily apparent and may be better understood by referring to the following detailed description of illustrative embodiments and accompanying drawings.

DETAILED DESCRIPTION OF THE INVENTION

Figure 1:
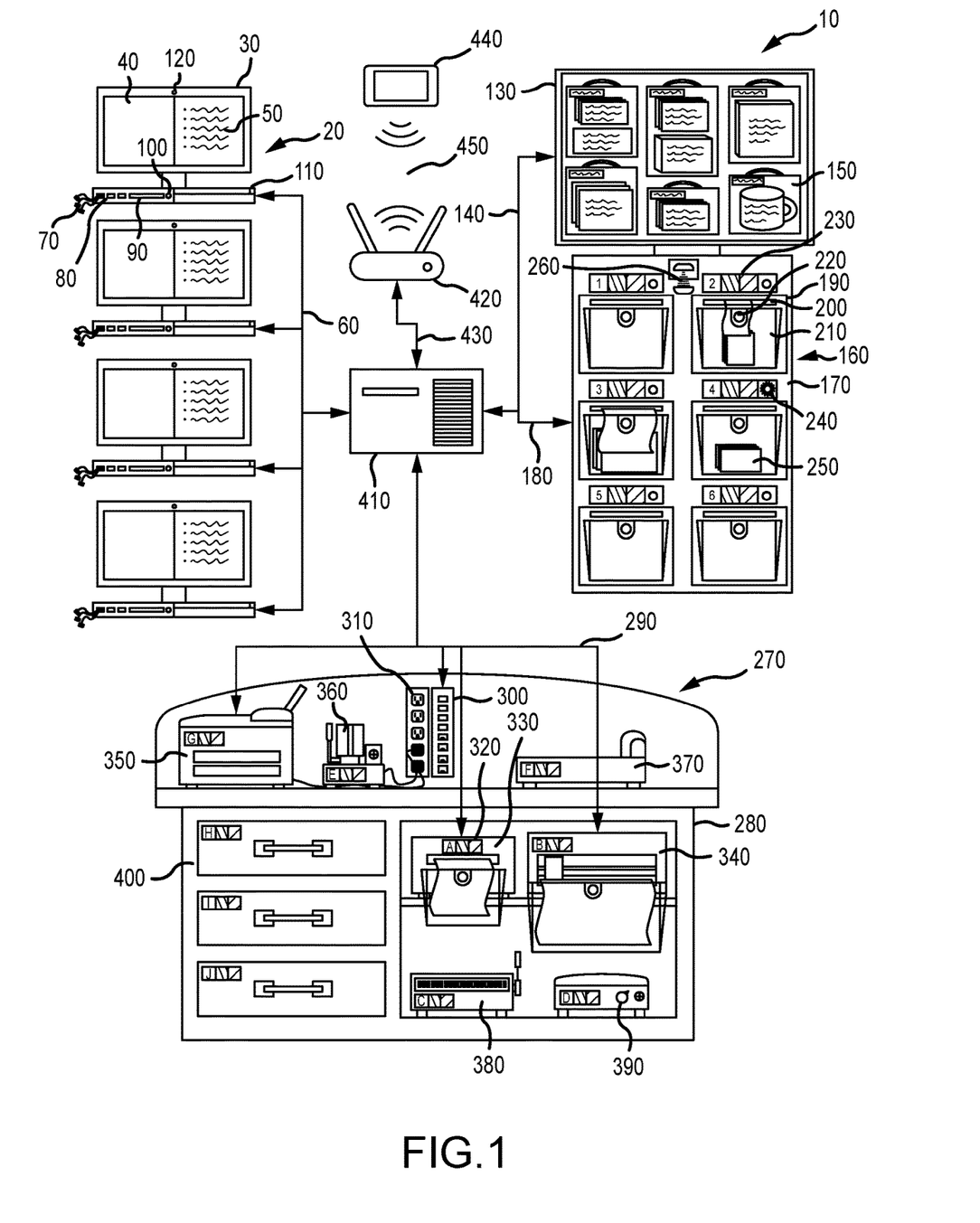
FIG. 1. is a graphical representation of a multi-user retail system, including a user input section, a user accessible output section, and an operator accessible output and finishing section, in accordance with an embodiment of the present invention.

Referring now in specific detail to the drawings, the present disclosure describes various embodiments of a multi-user photo-product creation system 10, as illustrated in FIG. 1. In an exemplary embodiment, the system 10 comprises three general segments: a user input terminal array 20, a user-accessible output array 160, and an operator-accessible output station 270. Each of these segments will be discussed in turn.

The user input terminal array 20 comprises one or more user input terminals 30. Each of the user input terminals 30 comprises a touch screen 40, which incorporates a GUI 50. Each of the user input terminals 30 further comprises means for receiving digital images from users. Such means may take the form of any user-accessible wired or wireless digital and hardcopy image input devices. For example, input terminal 30 may include a hardcopy scanner 110, a disk reader 90, a memory card reader, USB tether 80, a wireless Bluetooth interface 100, a wireless Wi-Fi interface, and various user-device wired interface plugs 70. A user may also add photos at the input terminal 30 by using camera 120 for live image and video capture. Live image capture with camera 120 is particularly useful for a user seeking personal photo identification documents, such as passport photos or the like. Through these means, users can upload or otherwise transfer digital images to the user input terminal 30, which are in turn used to produce photo products and fulfill photo product orders. Incorporating the various aforementioned user-input means allows users to provide or transfer images. Input terminal 30 is configured to receive hardcopy prints, negatives, transparencies and conventional digital images such as image and video files, remotely stored digital image files, and live capture images and videos.

The user input terminals 30, through touch screen 40 and GUI 50, are configured to enable photo editing, photo print selection, photo product selection creation, and photo product creation functionality. In one embodiment, the user input terminals are configured to enable editing via other means besides just touch screen 40. For example, input terminal 30 may also include additional control means such as voice input, digital drawing tablet input, pointing device input, gesture input, and GUI 50 replicated on and controlled by a smart phone GUI.

The user input terminals 30 are also configured to facilitate order placement and billing. According to a particular embodiment, the user input terminals 30 provide a physical and/or virtual billing receipt including alphanumeric and/or machine readable information representing the requested photo order. Accordingly, in such an embodiment, a user may use a user input terminal to upload or transfer digital images, edit the images, create a photo product or make a photo product selection, place an order for such photo product, and obtain a receipt for the order.

The user input terminal array 20 is connected via communication link 60 to one or more centralized computer processors 410. The communication link 60 may be a wired connection or wireless connection. Wireless communication between computer processor 410 and remote devices (e.g., user input terminal 30, operator communication device 440) is facilitated by communication link 430 which connects computer processor 410 to wireless router 420. Wireless communication between the computer processor 410 and remote devices occurs via wireless communication link 450, which can be any type of wireless communication link, such as Wi-Fi, cellular, or Bluetooth.

The second segment of system 10 is user-accessible output array 160. Output array 160 comprises master display 130 and one or more output array units 170, where each output array unit 170 houses one or more individual printer bays 190. Master display 130 graphically presents to customers and retail store clerks the status of all photo product orders at a given time, which are separated by order into order status indicators 150. Each order status indicator 150 represents a different photo product order. Order status indicator 150 conveys certain information about the particular photo product order, including, for example, the estimated completion time for the photo product order and retrieval location for the photo product order.

According to an embodiment, in practice, once a customer places a photo product order at one of the user input terminals 30, the order is communicated to the computer processor 410 via communication link 60. The photo product order is then further communicated to the user-accessible output array 160 via master display communication link 140 and output array unit communication link 180. Once output array 160 registers a new photo product order, master display 130 generates a new order status indicator 150 corresponding to the photo product order.

Output array unit 170 comprises one or more printer bays 190. Each printer bay 190 houses a printer, such as a thermal dye transfer printer, configured to make prints of variable sizes. Output array unit 170 may house a single printer bay 190 (containing only a single printer), but it is more optimal that output array unit 170 comprise a plurality of printer bays 190 (and thus a plurality of printers) in order to increase photo product fulfillment and workflow management efficiency. Each printer bay 190 comprises a print delivery slot 200. The printer inside of printer bay 190 produces prints in a manner so that completed prints 250 are fed through print delivery slot 200 into output collection bin 210. As discussed in more detail below, printer bay 190 may also include print sensor 220, which detects when a completed print 250 is fed through print delivery slot 200 into output collection bin 210. Output devices may be arrayed in a horizontal or vertical structure with integrated means to direct the user to the appropriate output device collection bin to retrieve the photo product order.

Output array 160 is configured to enable user accessibility. According to an embodiment, output collection bin 210 may be securely contained within printer bay 190 so that finished prints 250 are not accessible by the user until the user confirms payment and identity. Verification of payment and identity may be accomplished by presenting an order receipt to output array unit 160 at receipt reader 260. Once payment and identity are confirmed, output array unit 160 causes the appropriate printer bay(s) 190 to actuate or otherwise unlock access to output collection bin(s) 210 and finished photo prints 250. Alternatively, if an order is removed from the collection bin(s) 210, a warning alarm, indication, or a means to alert the operator can be used to prevent inadvertent retrieval of an order.

According to another embodiment, output array unit 170 further comprises a printer bay indicator 230 in association with each individual printer bay 190. Printer bay indicator 230 may be integrated into printer bay 190 or otherwise affixed to output array unit 170 adjacent to a particular printer bay 190. An exemplary illustration of a printer bay indicator 230 is provided in FIG. 2. Printer bay indicator 230 may comprise a human-readable portion, machine-readable portion, or both. For example, in the embodiment shown in FIG. 2, printer bay indicator 230 comprises human-readable portion 470, a color code patch portion 480, and a machine-readable portion 490. Color code patch 480 is used to assist customers with language barriers, such as the case of a traveler in a country where an unfamiliar language is spoken. In this case, a matching color is provided on master display 130 to indicate the appropriate printer bay for print order retrieval. In addition, color code patch 480 can be included on the physical or virtual order receipt to facilitate order retrieval. The human-readable portion 470 may be any type of alphanumeric character, intended to designate and distinguish the printer bays 190 from each other. The machine-readable portion 490 is provided for the same purpose, but may take any one of a variety of different formats, including, but not limited to standard bar code, QR code, near field communication device, and RF device.

Figure 2:
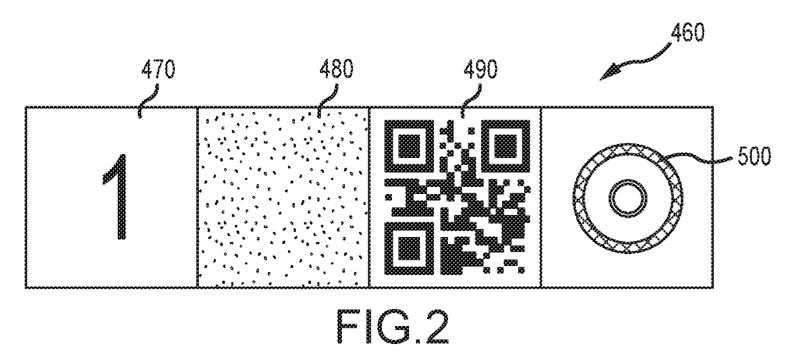
FIG. 2 is a graphical representation of a machine/human-readable indicator to identify a specific hardware or material item and its designated location, in accordance with an embodiment of the present invention.

Printer bay indicator 230 may also optionally include indicator light 240. Indicator light 240 may be any type of colored or non-colored light, designed to be a notification to users and retail store clerks alike. Light 240 may illuminate to indicate, among other things, when a photo print product (or print job) is complete, or when the printer in that particular printer bay needs maintenance or service.

Referring back to FIG. 1, output array unit 170 may also comprise receipt reader 260. Receipt reader 260 is configured to read both physical receipts and virtual receipts. According to an embodiment, after placing a photo product order at one of the input terminals 30, the input terminal 30 provides a receipt to the user, which specifies certain information about the photo product order. The receipt may be a physical paper receipt or a virtual/electronic receipt deliverable to a remote device, like a user's mobile phone. In one embodiment, a user takes her receipt to output array 160 to pick up a completed photo product order. The user inserts, scans, or otherwise causes her receipt to be read by receipt reader 260 in order to confirm payment and identity. Alternatively, the receipt may be used to retrieve the order and used for final payment at checkout in a different location within the retail store.

Figure 3A:
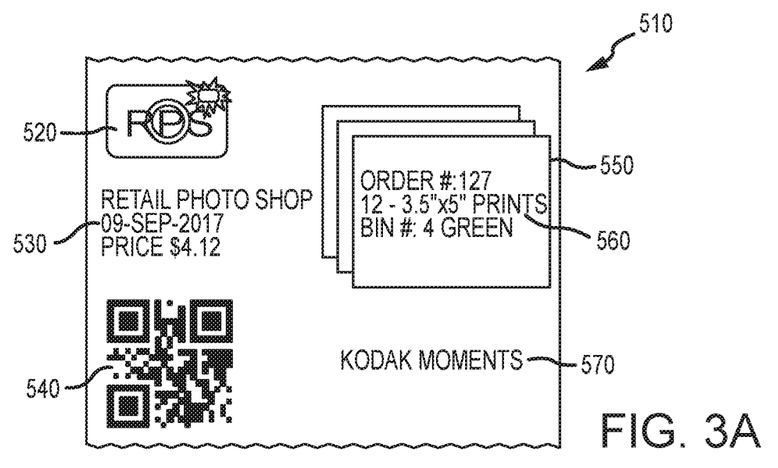
FIG. 3A is a graphical representation of a physical receipt in accordance with an embodiment of the present invention.
Figure 3B:
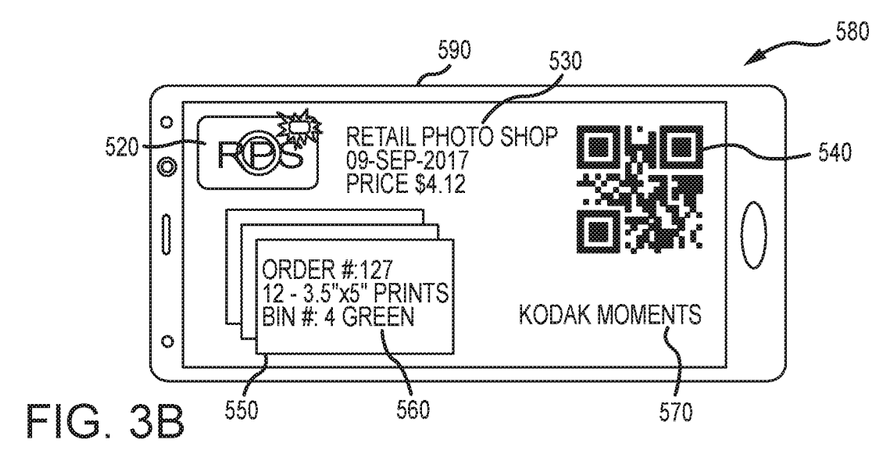
FIG. 3B is a graphical representation of a virtual receipt in accordance with an embodiment of the present invention.

FIG. 3A and FIG. 3B are exemplary illustrations of receipts that may be generated and delivered to a customer upon the customer's placing a photo product order. An exemplary physical paper receipt 510 is shown in FIG. 3A. The receipt may include various information, such as: retail store logo 520; human-readable retailer and order information 530 (e.g., name of retailer, date of photo product order, price of photo product order); retailer and order information embodied in a machine-readable format 540; manufacturer logo 570; and a graphical representation of the photo product order 550, including specific photo product order specifications 560. An exemplary virtual receipt 580 is shown in FIG. 3B. A virtual receipt 580 may be transmitted from a user input terminal 30 to a user's personal communication device 590 via any type of wireless connection (e.g., Wi-Fi, cellular, Bluetooth). The virtual receipt 580 may contain some or all of the same information described above with physical receipt 510.

Referring back to FIG. 1, the third segment of system 10 is a specialty output and finishing station 270. Retailers offer certain photo products that require specialty printing and finishing. Such products include photo albums, photo books, photo calendars, photo mugs, duplex photo products, large size photo posters, etc. Finishing station 270 is provided in order to manufacture and fulfill photo product orders for these items. The operator-accessible output devices of output and finishing station 270 produce photo products that require additional photo product finishing procedures, equipment, and/or materials that include drying, folding, creasing, scoring, cutting, stamping, binding, coating, rolling, mounting, framing, matting, image transfer, and/or packaging.

According to the embodiment shown in FIG. 1, the finishing station 270 comprises an operator-accessible finishing station cabinet/workstation 280, which houses or otherwise supports specialty printing and finishing equipment. Printer and finishing equipment that may be included or incorporated into workstation 280 includes the following: a duplex thermal printer 330, which is typically used to produce two-sided photo album pages; a large format ink jet printer 340, which is typically used to produce posters; an electrophotographic printer 350, which is typically used to produce greeting cards; a photo mug press 360; a paper cutting device 370; a binder device 380, for combining pages together into a booklet-type product (e.g., by comb or spiral binding); and a thermal adhesive binding device 390, also for binding pages together into a booklet-type product.

Finishing station 270 may further optionally comprise auxiliary connection ports and wired communication links 300, as well as a power connection strip 310. These features may be integrated into workstation 280, or readily provided adjacent to or in close proximity to workstation 280. Finally, in certain embodiments, workstation 280 further comprises accessory drawers 400, which can store additional finishing materials, printer media, parts, tools, and any other necessary equipment and accessories required to fulfill photo product orders.

According to the embodiment shown in FIG. 1, printer hardware incorporated into specialty output and finishing station 270 is connected to central computer processor 410 via communication link 290. It is through this link that digital images are transmitted from central processor 410 to the appropriate specialty printer in response to a photo product order. As shown in FIG. 1, communication link connects duplex thermal printer 330, large format ink jet printer 340, and electrophotographic printer 350 to central computer processor 410. As shown in FIG. 1, computer processor 410 may further be connected via communication link 290 to auxiliary connection ports 300.

Connection ports 300 are used to establish a wired communication connection with computer processor 410 and are used for diagnostic, maintenance, system update purposes, and to enhance the productivity of the system. A laptop can be connected to computer processor 410 via one of the connection ports 300 to perform system diagnostics, update the system software, color calibrate the system, and add new photo products and photo product graphics and templates. Connection ports 300 can also be used to connect a printer to computer processor 410 to diagnose a printer problem, calibrate the printer, or upgrade the printer's firmware. This allows the operator to perform these functions away from output array 160, freeing it up for consumer use. In addition, if due to increased seasonal consumer demand on the system or to respond to a promotional event, additional printers can be added to the system temporarily or permanently via connection ports 300 to enhance the printing capacity of the system to meet the increased demand.

Figure 4:
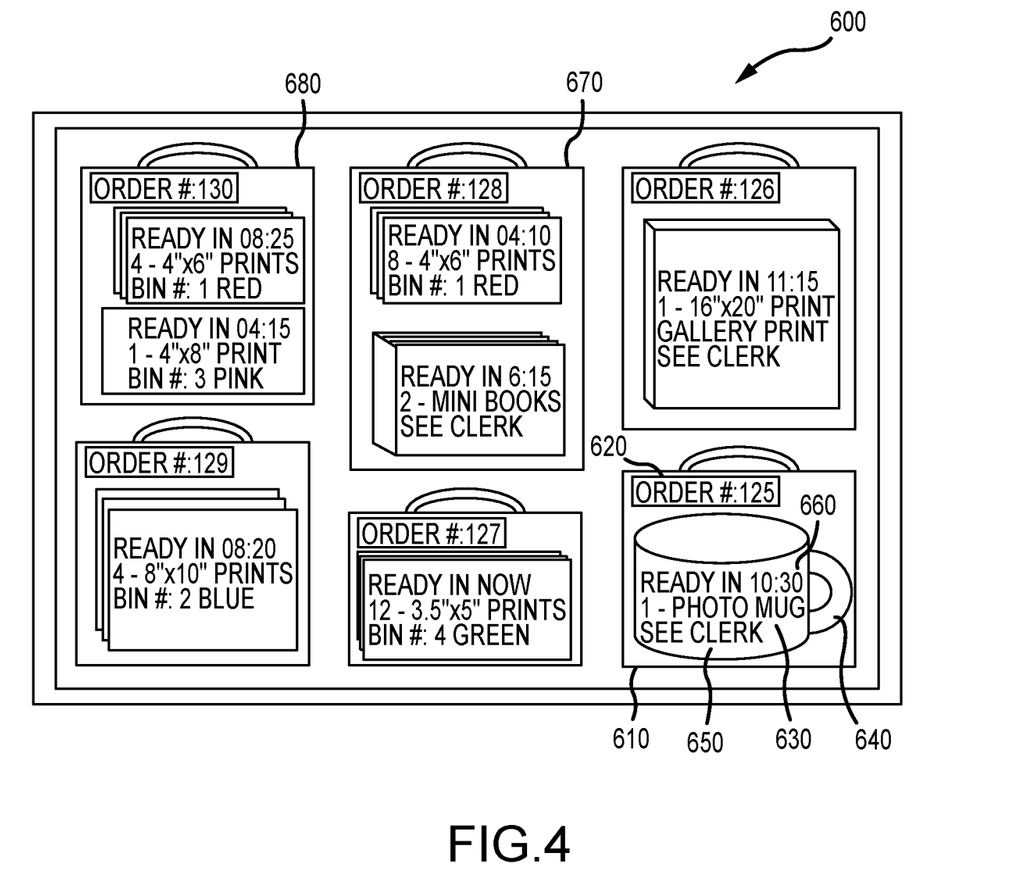
FIG. 4 is a graphical representation of the Master Display illustrating workflow and pending photo orders, in accordance with one embodiment of the present invention.

FIG. 4 illustrates an embodiment of the master display 130 of the output array 160. Master display 130 shown in FIG. 4 includes order status indicators (like those shown in FIG. 1) for six different photo product orders. Order status indicator 610 provides order information relating to order no. 125, which is a single-item order for a photo mug. This order status indicator 610 comprises the order number 620 (here, "Order #: 125"); photo product type and quantity information 630 (here, "1—Photo Mug"); a graphic representation 640 of the photo products in the order; photo product pickup location information 650 (here, "See Clerk"); and estimated photo product completion time 660 (here, "Ready in 10:30"). In this embodiment, the master display 130 displays an order status indicator for every order that is placed and pending. In certain jurisdictions, it is imperative to preserve the anonymity of the customer. As such, in certain embodiments, as shown in FIG. 4, orders are presented on the master display in a manner that preserves the individual user's personal anonymity (e.g., by referring to orders by order number as opposed to user name).

An order may be for a single photo product or multiple photo products. In this embodiment, each order status indicator provides information about every photo product in the order, regardless if the order is for a single photo product or for multiple photo products. For example, order status indicators 670 and 680 provide order information for multi-photo product orders. Order status indicator 670 corresponds to "Order #: 128," which includes eight 4"×6" prints and two mini books. Order status indicator 670 informs the customer of the estimated completion time for the prints and both mini books. It also provides pick-up location information for the prints and both mini books. The 4"×6" prints can be handled automatically by output array 160. Indeed, order status indicator 670 specifies that the prints will be ready for pickup at a specific printer bay 190 and output collection bin 210—namely, the collection bin 210 corresponding to the "1 Red" label, as conveyed by a printer bay indicator 230. The two mini books, on the other hand, require specialty printing and finishing, so they must be produced at the specialty output and finishing station 270 by a retail store clerk. Hence, order status indicator 670 informs the customer to "See Clerk" to pick up those particular photo products. Order status indicator 680 similarly provides information for a multi-photo product order—"Order #: 130." Output array 160 is capable of fulfilling this entire order, as it consists solely of photo prints that can be produced at different individual photo bays 190. Again, order status indicator 680 informs the customer of estimated completion time, photo product specification information, and pick up location for each of the photo products in the order. In addition, the order status indicators 150 presented on the master display 130 can be conveyed or augmented using any conventional means, such as "news ticker" or "crawler". An individual order status indicator 150 can be enhanced by including additional indicators, such as highlighting an order indicator with a different color, shape, or by flashing the indicator when that order is available for retrieval.

According to one embodiment, in practice, the central computer processor 410 routes a user's photo order to the appropriate digital output device (e.g., to a thermal printer in output array 160 or to a specialty printer at finishing station 270) and presents an approximate time of completion and indication of the location to retrieve the completed photo order on the master display 130. Upon completion of the photo order, the master display 130 is used to direct the user to the location of the completed photo order and the physical or virtual receipt is used to retrieve the completed photo product order.

Figure 5A:
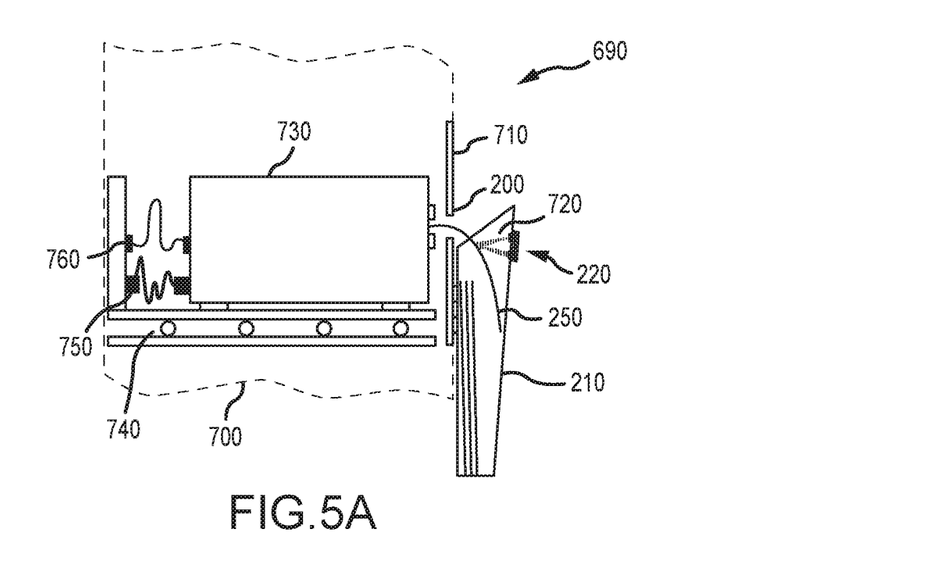
FIG. 5A is a cut away view of a section of the user-accessible printer bay while in operation mode, in accordance with an embodiment of the present invention.
Figure 5B:
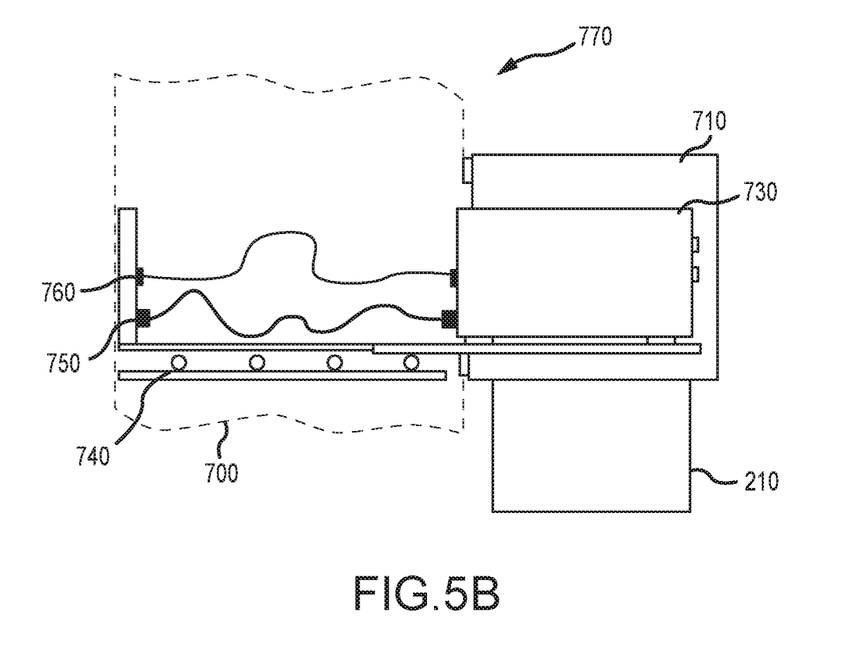
FIG. 5B is a cut away view of a section of the user-accessible printer array while in service mode, in accordance with an embodiment of the present invention.

Referring now to FIG. 5A and FIG. 5B, individual printer bays 190, according to an embodiment, are configured not only to operate in a standard "user mode," which is the typical mode for producing photo prints, but also in "operator service mode," which permits access to the printer for maintenance and service. FIG. 5A illustrates, in a cut away view, an embodiment of a printer bay 190 in user mode. The cut away view illustrates printer bay cabinet 700, which houses printer 730. Printer 730 sits on a shelving unit comprising an extendable printer support shelf 740. Printer 730 is operably connected to a power supply via power cable 750 and to a communication port via communication cable 760. Each individual printer bay 190 and printer bay cabinet 700 comprises a printer bay door 710. Printer 730 and printer bay door 710 are configured so that photo prints from printer 730 exit printer 730 and are pushed through print delivery slot 200 in printer bay door 710. In user mode, printer 730 is capable of fulfilling photo print orders. According to one embodiment, printer 730 is a thermal dye transfer printer capable of making photo prints of variable sizes and quantities.

As mentioned above, printer 730 makes photo prints and pushes completed prints from printer 730 through print delivery slot 200 and into output collection bin 210. According to an embodiment, each printer bay 190 comprises a print sensor 220, which can be connected to output collection bin 210 or printer bay door 710. Sensor 220 is configured to identify and recognize finished prints 250 as they pass through print delivery slot 200 and are collected in output collection bin 210. Sensor 220 may be further configured to detect when all the print output from the designated output device has completed printing and has been deposited into the appropriate collection bin is also used to inform the processor that printing has completed and to detect when the prints have been retrieved. The sensor 220 can be any suitable hardware, such as a motion detector, a light beam emitter/detector pair, an electromechanical switch, an electromagnetic switch, an RF device, infrared device, proximity sensor, camera, inductive proximity sensor, capacitive proximity sensor, photoelectric sensor, or the like. In one embodiment, sensor 220 emits a print sensor beam 720 to detect when a finished photo print 250 passes sensor 220.

FIG. 5B illustrates, as a cut away view of printer bay cabinet 700, an embodiment of a printer bay 190 in operator service mode. At times, it is necessary for an operator (e.g., retail store clerk or manufacturer technician) to access printer 730 within printer bay 190 and printer bay cabinet 700. Ordinarily during operation, printer 730 is contained within printer bay cabinet 700, enclosed by printer bay door 710. According to an embodiment, the printer bay door may comprise a locking mechanism, either mechanical (e.g., standard lock and key, combination lock etc.) or electronic (e.g., accessible via keypad or scanner). Such locking mechanism is for security and prevents customer users from gaining access to the printer hardware during the operation of user mode. The locking mechanism further limits retail customer access only to finished photo prints 250 in output collection bin 210. However, when printer 730 requires maintenance or service, an operator may access printer 730 by unlocking (if necessary) and opening printer bay door 710. Printer 730 can extend or slide out on extendable printer support shelf 740 to allow access to printer hardware features.

Figure 6A:
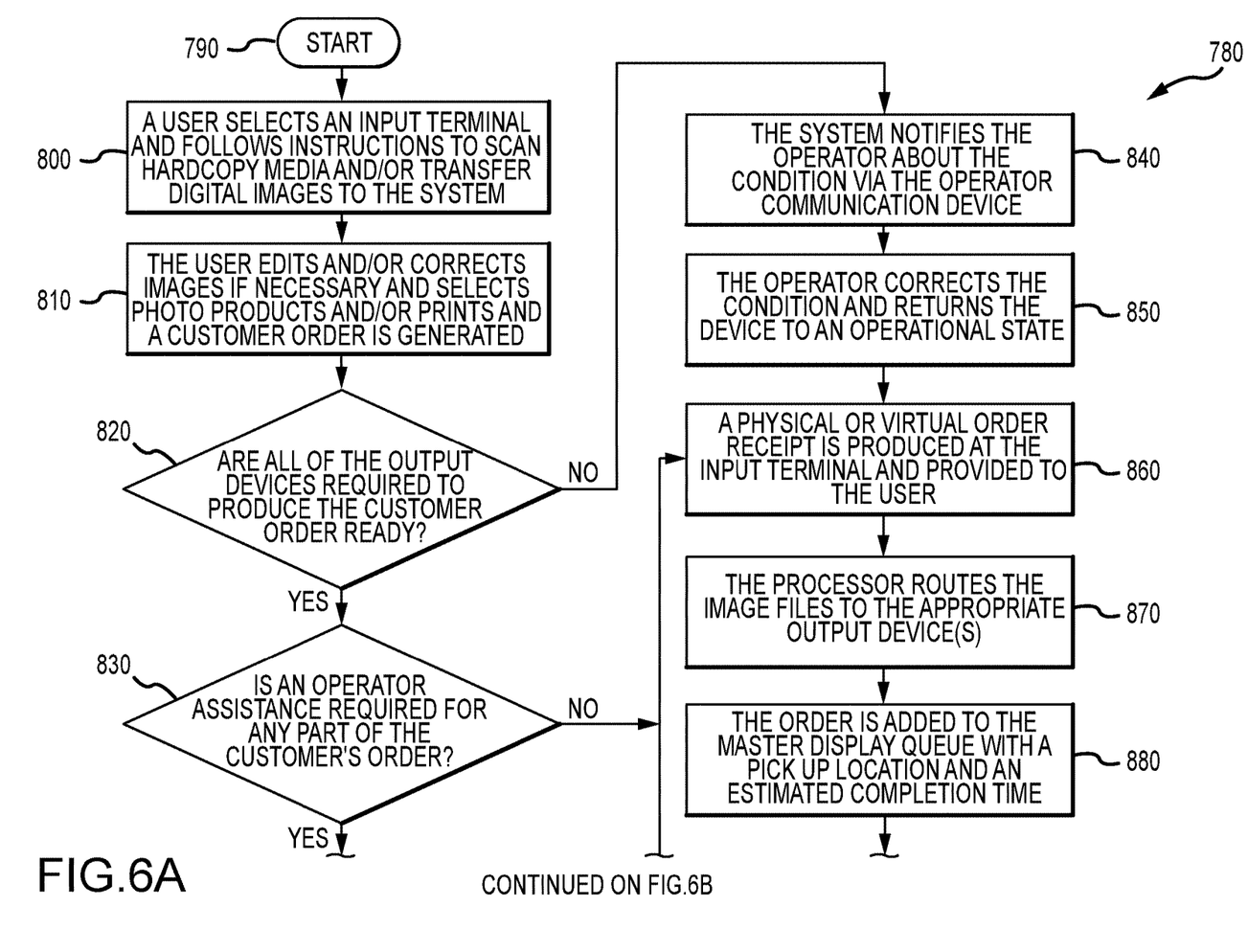
FIG. 6A is a flowchart illustrating an embodiment of the basic workflow of the present invention.
Figure 6B:
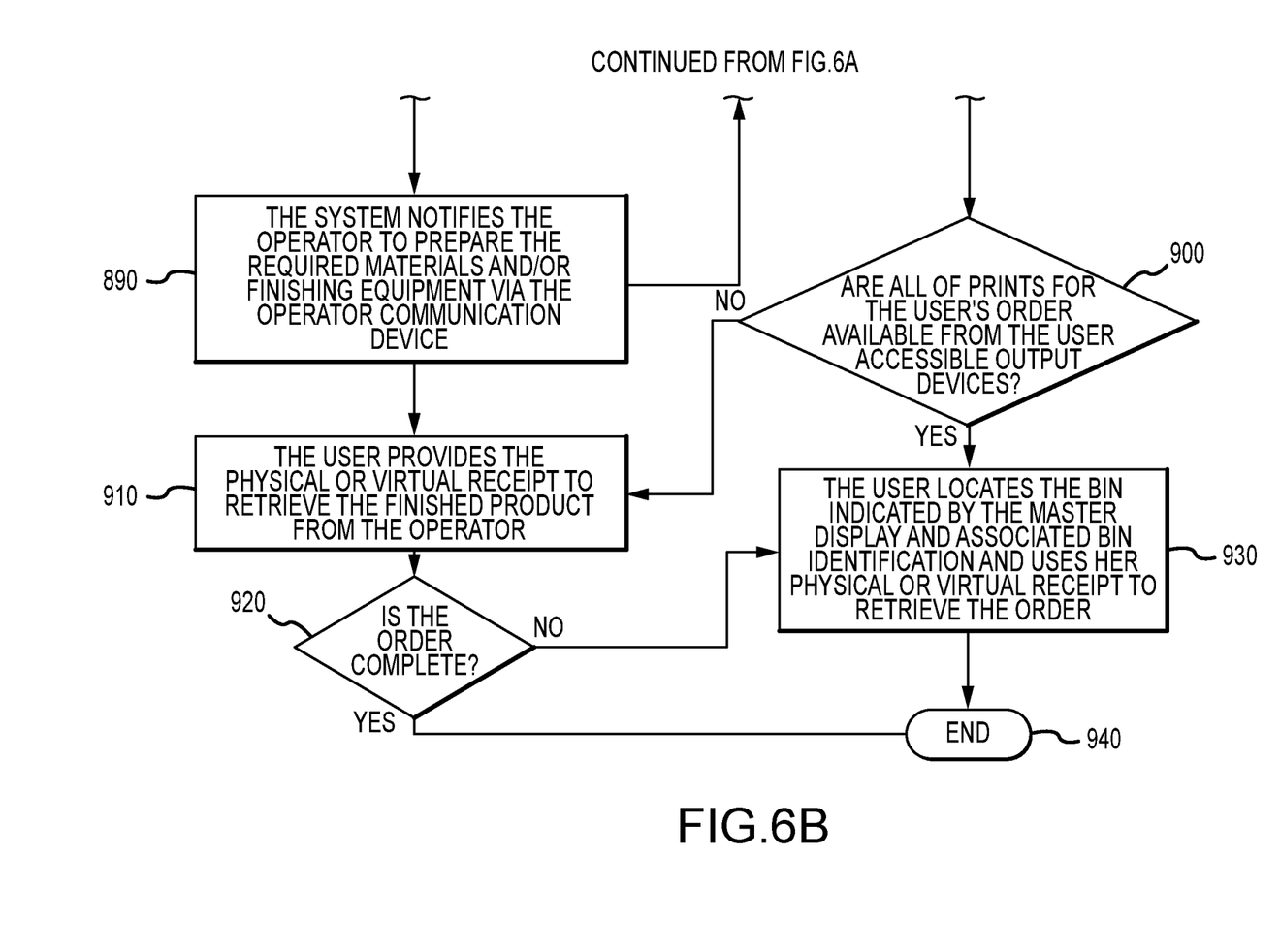
FIG. 6B is a continuation of the flowchart of FIG. 6A, which illustrates an embodiment of the workflow of the present invention.

Referring now to FIGS. 6A-6B, an embodiment for a method of using system 10 comprises, as a first step 800, a user selecting an input terminal and following instructions displayed on the input terminal for transferring digital images to the system. As described previously, the user may transfer digital images via wired or wireless connection, as well as via USB or other hardware storage unit; the user may transfer hard copy images using scanner 110; and the user may capture live images using camera 120. At step 810, the user may edit and modify the transferred images as necessary. At this step, the user also selects which photo products and photo print specifications desired in a new photo product order. At step 820, the system 10 determines whether all requisite output devices (i.e., all printer hardware required to fulfill the user's photo product order) are ready for use.

Figure 7A:
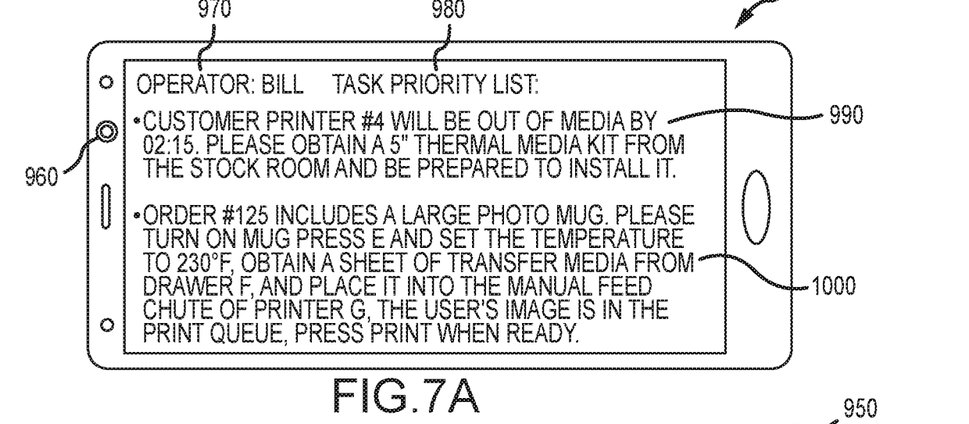
FIG. 7A is a graphical representation of the operator communication device while in "task mode," in accordance with an embodiment of the present invention.
Figure 7B:
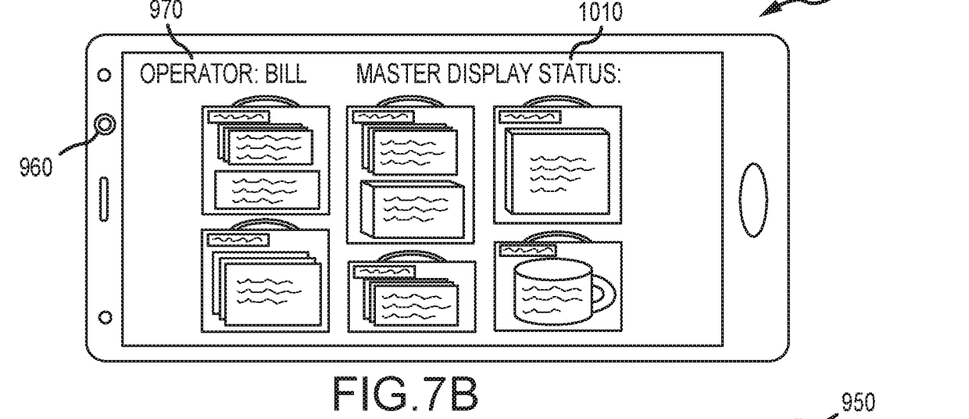
FIG. 7B is a graphical representation of the operator communication device while in the "master display mode," in accordance with an embodiment of the present invention.
Figure 7C:
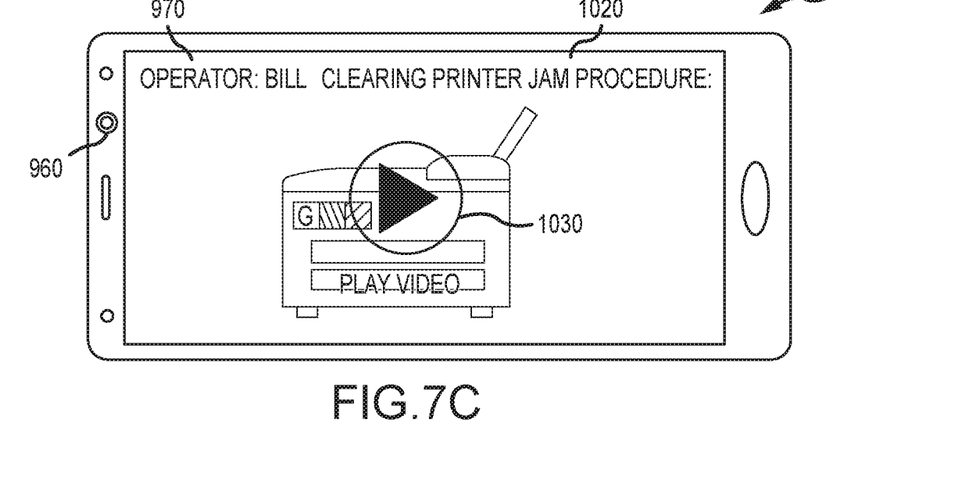
FIG. 7C is a graphical representation of the operator communication device in the "procedure instruction mode," in accordance with an embodiment of the present invention.

If all of the requisite output devices are not prepared and ready to fulfill the user's photo product order, then the system 10 notifies the operator (e.g., retail store clerk) about the condition. According to an embodiment, the system 10 communicates such a notification to an operator communication device, which can be any type of remote mobile device, such as a smartphone or tablet computer. Certain embodiments of operator communication devices and their functionality are illustrated in FIGS. 7A-7C, which are described in more detail below. Upon being notified of a specific condition relating to one of the requisite output devices, the operator, in step 850, addresses the condition and returns the machines to an operable state. Certain conditions can occur that require operator attention, including, but not limited to, the following: replenishing photo media, hardware malfunctions, installing driver updates, attending to media jams and tears, printer calibration, routine maintenance such as cleaning media dust and ink leakage and overspill, cleaning print heads, lubricating media transport systems, replacing defective and worn parts and assemblies, emptying media chad catch trays, replacing dulled media knife cutting assemblies, and replacing a failed printer with a functioning replacement. Once all of the output devices are ready to fulfill the user's photo product order, the input terminal produces an order receipt for the user (step 860). As described previously, the input terminal can provide a physical receipt, virtual receipt, or both. In step 870, the input terminal then transmits the photo product order to the centralized computer processor, which parses the order and routes communication commands to appropriate output devices in order to fulfill all items in the order.

Once the system 10 processes the user's photo product order (particularly, once the computer processor processes and routes the order to the appropriate output devices), the order is added to the master display 130 (step 880). According to an embodiment, orders are automatically routed into a queue, so that they are fulfilled in chronological order based on time of receipt, except for modifications based on available output device resources. According to step 880, the master display creates a new order status indicator 150 for the new order, conveying to users and operators the pick-up location and estimated completion time, among other information, as described previously.

In addition to checking for available output device resources, system 10 also checks, upon receiving a new photo product order, whether any of the photo products in the order require operator attention, operator assistance, or operator finishing (step 830). As mentioned previously, certain photo products require printing on specialty output devices, which may require special operator attention to prepare or otherwise ready the device. Certain photo products may additionally require operator attention to perform finishing steps, such as binding. If no operator assistance is required to fulfill any part of the order, then the input terminal 30 produces the order receipt and the order is transmitted to the central computer processor for imitation, as described previously. If operator assistance is required, however, then system 10 communicates a notification to the operator regarding the order and the required attention to fulfill the order (step 890). In certain embodiments, a notification may issue if a requisite output device requires additional materials (e.g., print media), if specialty output devices attention to be activated or readied, or if additional finishing equipment and materials are required.

Once a user is issued a receipt for a photo product order, the user must take the receipt to the retail store, specifically to output array 160, to retrieve the finished order. If the order is complete, then the user would be able to retrieve finished products requiring operator assistance from the operator and would be able to retrieve finished photo prints from the appropriate output collection bins 210, as would be displayed on the appropriate order status indicator 150 on master display 130 (steps 900, 910, 920, 930).

According to an embodiment, system 10 comprises an operator communication device 950, as illustrated in FIG. 7A-7C. In such embodiments, the operator maintains control of communication device 950, which may operate in several different modes to provide, among other things, task priority list to the operator, output device maintenance instructions to the operator, and a real-time duplicate of master display 130 and order status indicators 150. Communication device 950 may be any type of remote mobile device with display and processing unit, such as a smart phone or tablet computer. In one embodiment, communication device 950 comprises a camera and machine readable code reader 960. Communication device 950 is configured to receive communications and notifications from system 10. Communication device 950 informs the designated operator by means of a text message, audio message, and/or audio visual presentation and includes information relevant one or more impending tasks, including; instructions, procedures, required equipment, required materials, and/or contact information for obtaining additional assistance. Notifications may be transmitted from computer processor 410 to communication device 950 via wireless router 420. Communications can be transmitted according to any known protocol, such as Wi-Fi.

FIG. 7A illustrates an embodiment of communication device 950 in task priority mode. The mode of operation is displayed on communication device 950—here, as "Task Priority List" (980). The communication device further displays the identity of the current operator 970. Different retail store clerks may have different login profiles. The retail clerk on duty who is responsible for fulfilling photo product order logs into the system 10, and the login is reflected on the display of communication device 950. In task priority mode, the communication device 950 displays a list of tasks to the operator, in order of priority. Typically, the tasks are prioritized chronologically based on the time when the photo product orders are entered. However, if a particular photo product order requires a specific task to be completed in order to begin or produce a photo product, that particular task may jump the priority list. For example, if a specialty output device needs to be stocked, turned on, warmed-up, or otherwise readied for use, system 10 will notify the operator of the need to complete that task, and can prioritize that task ahead of others, even if other orders had been previously submitted. One advantage of system 10 is to create a task priority list that facilitates fulfilling all pending photo product orders chronologically, but also in the most efficient and timely manner as possible given the requirements of each photo product order.

FIG. 7A further illustrates some exemplary tasks (990, 1000) that might appear on communication device 950. The tasks can relate to specific photo product orders, but can also relate to general maintenance and up-keep of the output devices. Task 990, for instance, instructs the operator that a particular printer (Printer #4) will run out of printer media by a certain time. The notification further instructs the operator of the specific type of media that needs to be restocked and where to obtain the media in the retail store. Task 1000 is directed to a specific photo order. This task notifies the operator that Order #125 requires producing a large photo mug. The task communicated to the operator provides instructions for preparing the appropriate output device (i.e., "Please turn on Mug Press E and set the temperature to 230° F.); obtaining the appropriate photo media, including the location of such media (i.e., "obtain a sheet of transfer media from Drawer F"); and readying the output device with the media so that the photo product can be produced (i.e., "place [photo media] into the manual feed chute of Printer G").

FIG. 7B illustrates an embodiment of communication device 950 in master display mode. In this mode, the master display is replicated and displayed on communication device 950. This allows the operator to move around the retail store and attend to other non-photo related tasks while still being able to stay updated as to the status of all pending photo orders. Just as would be displayed on master display 130, communication device 950 displays order status indicators for each pending photo product order. According to an embodiment, the operator may toggle between task priority mode and master display mode. Further, when a new task is required, the communication device may alert the operator with an audible and visual notification on communication device 950. The communication device likewise may automatically toggle from master display mode to task priority mode when a task needs to be completed with certain immediacy. For instance, if the operator forgets to restock Printer #4, communication device 950 can automatically toggle from master display mode to the task priority list while also providing an audible and visual notification. This can be pre-set to occur at any number of intervals before the task expiration deadline—e.g., communication device 950 can issue notifications at ten, five, and one minute before the printer actually runs out of media so as to remind the operator.

FIG. 7C illustrates an embodiment of communication device 950 in operator procedure library mode 1020. According to this embodiment, communication device 950 maintains on a local hard drive a library of instructional videos explaining how to maintain and service all of the output devices in the retail store. Alternatively, the videos may be stored on remote storage accessible by communication device (e.g., cloud-based storage) or available online, accessible by communication device 950 via the Internet. Such instructional videos may teach operators how to perform various tasks related to all output devices in the retail store, such as how-to-use procedures (e.g., exemplary videos showing how each output device works), how-to-prepare and ready procedures (e.g., exemplary videos showing how to turn-on, prepare, and otherwise ready a device for printing), and general maintenance procedures (e.g., restocking photo media, clearing paper jams).

It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A method of operating a photo product creation system, comprising:
   receiving images via a user-accessible image input device at a user input terminal;
   receiving a photo order at the user input terminal, the photo order comprising one or more photo products that incorporate the images;
   transmitting the images and the photo order from the user input terminal to a centralized computer processor located separate from the user input terminal;
   routing the photo order from the centralized computer processor to a user-accessible output array located separate from the user input terminal and the centralized computer processor, wherein the user-accessible output array comprises a plurality of output array units;
   calculating a fee for the photo order;
   calculating an approximate time of completion for the photo order;
   producing a receipt at the user input terminal, wherein the receipt is either a physical receipt or virtual receipt comprising alphanumeric and machine readable information representing the requested photo order;
   displaying, an order status indicator at the user-accessible output array, wherein the order status indicator comprises the approximate time of completion for each of the photo products in the photo order and a pick-up location for each of the photo products, wherein each pick-up location is a specifically identified output array unit corresponding to each of the one or more photo products in the photo order;
   transmitting, by the centralized computer processor, a notification to a remote communication device whether any of the photo products requires specialty finishing;
   updating the order status indicator at the user-accessible output array upon completion of the photo products in the photo order;
   verifying prior payment of the fee for the photo order and verifying the identification of the photo order by reading the receipt by a receipt reader at the user-accessible output array to allow access to the output array units corresponding to the pick-up locations for each of the photo products in the photo order, wherein allowing access comprises unlocking a locking mechanism at each of the output array units corresponding to the pick-up locations for each of the photo products in the photo order.

2. The method of claim 1, further comprising receiving, at the user input terminal, user-selected photo edits.

3. The method of claim 1, wherein the user-accessible image input device is selected from the group consisting of: a hardcopy scanner, a disk reader, a memory card reader, a USB tether, a camera, a wireless Bluetooth communication device, a wireless WIFI communication device, and a modem to access remotely stored images via a communications network.

4. The method of claim 1, wherein the receipt is a virtual receipt and the method further comprises transmitting the virtual receipt to a remote communication device.

5. The method of claim 1, wherein each output array unit comprises an output device and a collection bin for completed photo products, wherein the output device is selected from the group consisting of: a thermal dye transfer printer, an inkjet printer, an electrophotographic printer, a disk writer, a portable memory device, and a modem configured to transfer digital images.

6. The method of claim 1, wherein the user input terminal comprises a touch screen display, a Graphic User Interface (GUI) configured to receive user-input controls, voice input means, digital tablet input means, pointing device input means, gesture input means.

7. The method of claim 1, wherein the images comprise one or more types of images selected from the group consisting of: a hardcopy print, a negative, a conventional digital image.

8. The method of claim 1, wherein receiving images via the user-accessible image input device comprises receiving user-provided images via a camera integrated into the user input terminal.

9. The method of claim 1, wherein reading the receipt at the user-accessible output array completes the transaction.

10. The method of claim 1, further comprising producing one or more of the photo products on a specialty output device.

11. The method of claim 1, further comprising performing finishing procedures to complete one or more of the photo products, the finishing procedures selected from the group consisting of: drying, folding, creasing, scoring, cutting, stamping, binding, coating, rolling, mounting, framing, matting, image transfer, and packaging.

12. The method of claim 1, further comprising producing a notification on the remote communication device, the notification selected from the group consisting of: a text message, an audio message, and an audio visual presentation.

13. The method of claim 1, wherein the remote communication device is selected from the group consisting of: a pager, a smart phone, a remote display terminal, and a display equipped check out terminal.

14. The method of claim 1, wherein the user-accessible output array comprises a master display, and the method further comprises displaying, on the master display, the estimated completion time and pick-up location for each of the photo products in the photo order.

15. The method of claim 14, further comprising replicating the master display interface on the remote communication device, a remote display terminal, or a display equipped checkout terminal.

16. A photo product creation system, comprising:
   a plurality of user input terminals;
   a central computer processor located separate from the plurality of user input terminals,
   a user-accessible output array located separate from the plurality of user input terminals and the central computer processor, wherein the user-accessible output array comprises a master display and a plurality of output array units, wherein each of the output array units comprises an output collection bin and a printer bay, and wherein each printer bay comprises an output device; and
   an operator-accessible finishing station;
   wherein each of the plurality of user input terminals, the central computer processor, the user-accessible output array, and the operator-accessible finishing station are operatively interconnected and configured to communicate;
   wherein the plurality of user input terminals are configured to receive digital images and a photo order and route the photo order to the central computer processor and produce a receipt comprising an identification of the photo order, wherein the receipt is either a physical receipt or virtual receipt comprising alphanumeric and machine readable information representing the requested photo order, and wherein the photo order comprises one or more photo products incorporating the digital images;

wherein the central computer processor is configured to route the photo order to the user-accessible output array and to the operator-accessible finishing station; and wherein the user-accessible output array is configured to produce the photo products of the photo order, indicate completion of the photo order and a pick-up location for each of the photo products via an order status indicator on the master display, and verify prior payment and an identification corresponding to the photo order by reading the receipt by a receipt reader to allow user access to the photo products in the photo order, wherein allowing access comprises unlocking a locking mechanism at each of the output array units securing the one or more output collection bins corresponding to pick-up locations for each of the photo products in the photo order.

17. The system of claim 16, wherein each output array unit further comprises an indicator comprising at least one printer bay code selected from the group consisting of: an alphanumeric human readable message, a machine-readable code, a color code, a Near Field Communication device, a Radio Frequency Communication device, and an illuminated indicator.

18. The system of claim 16, wherein the output collection bin comprises a sensor means to detect when an output device has completed producing prints and when the completed prints have been deposited into the output collection bin.

19. The system of claim 18, wherein the output collection bin further comprises a second sensor means to detect when a set of completed prints has been retrieved from the output collection bin.

20. The system of claim 18, wherein the sensor means to detect when an output device has completed producing prints is selected from the group consisting of: a motion detector, a light beam emitter and detector pair, an electromechanical switch, and an electromagnetic switch.

21. The system of claim 18, wherein the sensor means to detect when an output device has completed producing prints is configured to communicate to the central computer processor when and printing has completed.

22. The system of claim 18, wherein the sensor means to detect when completed prints have been retrieved is configured to communicate to the central computer processor when the prints are retrieved.

23. The system of claim 16, wherein the master display is configured to display an estimated completion time and a pick-up location for each of the photo products in the photo order.

24. The system of claim 16, wherein the operator-accessible finishing station comprises a specialty output device, a photo finishing equipment unit, and an indicator for each of the specialty output device and the photo finishing equipment unit, wherein the indicator is selected from the group consisting of: an alphanumeric human readable message, a machine-readable code, a color code, a Near Field Communication device, a Radio Frequency Communication device, an illuminated indicator, and/or a display.

25. The system of claim 24, further comprising a remote communication device configured to communicate with at least the indicator for the specialty output device and the indicator for the photo finishing equipment unit.

\* \* \* \* \*